(12) United States Patent
Adelman

(10) Patent No.: US 8,738,564 B2
(45) Date of Patent: May 27, 2014

(54) METHOD FOR POLLEN-BASED GEOLOCATION

(75) Inventor: Jonathan David Adelman, Mexico, NY (US)

(73) Assignee: Syracuse University, Syracuse, NY (US)

( * ) Notice: Subject to any disclaimer, the term of this patent is extended or adjusted under 35 U.S.C. 154(b) by 744 days.

(21) Appl. No.: 12/898,049

(22) Filed: Oct. 5, 2010

(65) Prior Publication Data

US 2012/0084249 A1    Apr. 5, 2012

(51) Int. Cl.
*G06F 9/44* (2006.01)

(52) U.S. Cl.
USPC .......................................................... 706/52

(58) Field of Classification Search
USPC .......................................................... 378/71
See application file for complete search history.

(56) References Cited

U.S. PATENT DOCUMENTS

| | | | |
|---|---|---|---|
| 7,142,297 B2 | 11/2006 | Zechner | |
| 7,188,048 B2 | 3/2007 | Kouritzin et al. | |
| 7,219,032 B2 | 5/2007 | Spiesberger | |
| 7,266,484 B2 | 9/2007 | Lombardo et al. | |
| 7,299,135 B2 | 11/2007 | Thayer | |
| 2004/0111220 A1 | 6/2004 | Ochs et al. | |
| 2004/0133355 A1 | 7/2004 | Schneider | |
| 2005/0261841 A1* | 11/2005 | Shepard et al. | 702/32 |
| 2007/0168135 A1 | 7/2007 | Agarwal et al. | |
| 2008/0243435 A1 | 10/2008 | Deinzer et al. | |
| 2008/0249753 A1 | 10/2008 | Wilson et al. | |

OTHER PUBLICATIONS

'Modern pollen/land-use relationships as an aid in the reconstruction of past land uses and cultural landscapes: An example from south Sweden': Gaillard, 1992, pringer-Verlag Veget Hist archaeobotany, I 3-17.*

Markov chain Monte Carlo for autologistic regression models with application to the distribution of plant species': Huffer, 1998, Biometrics vol. 54. No. 2, Jun. 1998.*

Title: Maximum Likelihood Inference for Seed and Pollen Dispersal Distributions Author: Jones Source: Journal of Agriculture, Biological & Environmental Statistics, vol. 8, No. 2, Jun. 1, 2003, pp. 170-183 (14). Digital Ojbect Indentifier: 10.1198/108571103322161531.

Title: International Statisitcal Ecology Conference, National Center for Statistical Ecology Source: International Statistical Ecology Conference, University of St. Andrews, 2008, pp. 8-10, 13, 17, 21-23, and 39.

Title: Accuracy of Geolocation Estimates for Flying Seabirds Author: Phillips et al. Source: Marine Ecology Progress Series, 2004.

Title: Movements of Marine Fish and Decapod Crustaceans: Process, Theory and Application Author: Pittman et al. Source: Advances in Marine Biology, 2001.

Title: Meta-Analysis of Animal Movement Using State-Space Models Author: Jonsen et al.

* cited by examiner

*Primary Examiner* — Kakali Chaki
*Assistant Examiner* — Peter Coughlan
(74) *Attorney, Agent, or Firm* — George R. McGuire; Blaine T. Bettinger; Bond Schoeneck & King, PLLC

(57) ABSTRACT

A method for pollen-based geolocation. The method determines the probability P that a given location is part of the travel history of a given sample. Using simulated datasets and Monte Carlo simulation, the model parameters can be precisely associated with P, thereby allowing the algorithm to operate on real-life samples of interest.

8 Claims, 9 Drawing Sheets

$$\begin{pmatrix} P_{A1} & P_{B1} & P_{C1} & P_{D1} & . & . & . & P_{X1} \\ P_{A2} & P_{B2} & P_{C2} & P_{D2} & . & . & . & P_{X2} \\ P_{A3} & P_{B3} & P_{C3} & P_{D3} & . & . & . & P_{X3} \\ P_{A4} & P_{B4} & P_{C4} & P_{D4} & . & . & . & P_{X4} \\ . & . & . & . & & & & . \\ . & . & . & . & & & & . \\ . & . & . & . & & & & . \\ P_{AY} & P_{BY} & P_{CY} & P_{DY} & . & . & . & P_{XY} \end{pmatrix}$$

FIG. 3

|   | A | B | C | D | E | F | G | H | I |
|---|---|---|---|---|---|---|---|---|---|
| 1 | 0 | 0 | 0 | 0 | 0 | 1 | 0 | 0 | 1 |
| 2 | 0 | 1 | 0 | 0 | 0 | 0 | 0 | 0 | 0 |
| 3 | 0 | 0 | 0 | 0 | 0 | 1 | 0 | 0 | 0 |
| 4 | 0 | 1 | 0 | 0 | 0 | 0 | 0 | 0 | 1 |
| 5 | 0 | 0 | 0 | 0 | 0 | 1 | 1 | 0 | 0 |
| 6 | 0 | 1 | 1 | 0 | 0 | 1 | 0 | 0 | 0 |
| 7 | 1 | 0 | 0 | 0 | 0 | 0 | 0 | 0 | 0 |

FIG. 4

|   | A | B | C | D | E | F | G | H | I |
|---|---|---|---|---|---|---|---|---|---|
| 1 |   |   |   |   |   |   |   |   |   |
| 2 | 0 | 1 | 0 | 0 | 0 | 0 | 0 | 0 | 0 |
| 3 |   |   |   |   |   |   |   |   |   |
| 4 | 0 | 1 | 0 | 0 | 0 | 0 | 0 | 0 | 1 |
| 5 |   |   |   |   |   |   |   |   |   |
| 6 |   |   |   |   |   |   |   |   |   |
| 7 | 1 | 0 | 0 | 0 | 0 | 0 | 0 | 0 | 0 |

FIG. 5

|   | A | B | G | L | N | Q | R | T | Z |
|---|---|---|---|---|---|---|---|---|---|
| 1 | 0 | 1 | 0 | 0 | 0 | 1 | 0 | 0 | 1 |
| 2 | 1 | 0 | 0 | 0 | 0 | 0 | 0 | 0 | 0 |
| 3 | 0 | 0 | 1 | 0 | 0 | 0 | 0 | 0 | 0 |
| 4 | 1 | 0 | 0 | 0 | 0 | 0 | 0 | 1 | 0 |
| 5 | 0 | 0 | 0 | 0 | 0 | 1 | 1 | 0 | 0 |
| 6 | 0 | 1 | 1 | 1 | 1 | 1 | 1 | 1 | 1 |

FIG. 7

$$\begin{array}{c} \phantom{1} \\ 1 \\ 2 \\ 3 \\ 4 \\ 5 \\ 6 \end{array} \begin{pmatrix} A & B & G & L & N & Q & R & T & Z \\ & & & & & & & & \\ 1 & 0 & 0 & 0 & 0 & 0 & 0 & 0 & 0 \\ 0 & 0 & 1 & 0 & 0 & 0 & 0 & 0 & 0 \\ 1 & 0 & 0 & 0 & 0 & 0 & 0 & 1 & 0 \\ & & & & & & & & \\ & & & & & & & & \end{pmatrix}$$

FIG. 8

METHOD FOR POLLEN-BASED GEOLOCATION

BACKGROUND OF THE INVENTION

1. Field of the Invention

The present invention relates to a method of pollen-based geolocation, and more particularly, to a method for determining the geographic history of a target of interest using pollen-based geolocation.

2. Description of the Related Art

In an increasingly interconnected world, there is a need to quickly and efficiently track the geographic origin or travel history of an item. A pollen-based geolocation system is one way to accomplish this goal since distinct geographic locations typically possess unique pollen profiles. Forensic palynology, for example, is the study of pollen to determine the geographic location an item might have originated from or traveled through, as well as when it might have done so. Forensic palynology is often used by law enforcement to gather evidence about certain types of crimes.

A robust pollen-based geolocation algorithm can be used for numerous applications including: (i) tracking the travel history of a person or item; (ii) determining the point of origin of a person or item; and (iii) estimating the approximate date or time of year that an object was in a geographic location, among others.

Prior pollen-based geolocation methods have relied on complicated numeration-based algorithms that are qualitative, rather than quantitative, in nature. Additionally, prior methods have been unable to resolve the problem of spatial dependence of neighboring locations in which locations that are geographically close to each other have similar distributions of plant species.

SUMMARY OF THE INVENTION

It is therefore a principal object and advantage of the present invention to provide a method for pollen-based geolocation.

It is a further object and advantage of the present invention to provide a quantitative method for pollen-based geolocation.

It is another object and advantage of the present invention to provide a method for pollen-based geolocation that assigns probabilities to all possible locations in an item's travel history.

It is yet another object and advantage of the present invention to provide a method for pollen-based geolocation that resolves the problem of spatial dependence of neighboring locations.

Other objects and advantages of the present invention will in part be obvious, and in part appear hereinafter.

In accordance with the foregoing objects and advantages, the present invention provides a method for pollen-based geolocation, the method comprising: (a) using Monte Carlo simulation to determine an association between a model parameter and a probability P that a first geographic location is a member of the geographic history of a hypothetical target of interest; and (b) using said association to determine the geographic history of said target of interest.

A further embodiment of the present invention provides a method for pollen-based geolocation wherein Monte Carlo simulation comprises the steps of: (c) generating a set of random variables corresponding to a plurality of geographic locations and a plurality of plant species associated with pollen detected on a hypothetical target; (d) populating a first matrix with the set of random variables wherein each column of the first matrix contains one of the plurality of geographic locations and each row of the first matrix contains one of the plurality of plant species; (e) identifying one of the plurality of geographic locations containing the most plant species in the first matrix; (f) assigning a first weighted score W to the each of the plurality of geographic locations identified in step (e); (g) removing each row from the first matrix that corresponds to the plant species found in the geographic locations identified in step (e) that receives a highest first weighted score W; (h) repeating steps (e) through (g) until every row of the first matrix is removed; (i) associating with at least one of the geographic locations a first average weighted score W; (j) repeating steps (c) through (i); and (k) deriving a mathematical function that associates the first average weighted score W with the probability P that each of the geographic locations is a member of the geographic history of the target of interest.

Yet another embodiment of the present invention is a method for pollen-based geolocation wherein the Monte Carlo simulations are used to determine the geographic history of said target of interest through the steps of: (l) collecting a sample of pollen from the target of interest; (m) identifying at least one plant species in the sample; (n) populating a second matrix with the identified plant species in rows in the second matrix, and the geographic location(s) containing those plant species in columns in the second matrix; (o) identifying the geographic location that contains the most plant species in the second matrix; (p) assigning a second weighted score W to the geographic location(s) identified in step (n); (q) removing each row of the second matrix that corresponds to a plant species found in the geographic location identified in step (o); (r) repeating steps (o) through (q) until every row of the second matrix is removed; (s) assigning a second average weighted score W to the geographic location (s) of step (n); and (t) utilizing the derived mathematical function described in step (k) that transforms the second average weighted score W of the geographic location(s) into the probability P that geographic location(s) is a member of the geographic history of said target of interest.

BRIEF DESCRIPTION OF THE DRAWINGS

The present invention will be more fully understood and appreciated by reading the following Detailed Description of the Invention in conjunction with the accompanying drawings, in which:

FIG. 3 is a matrix of plant species in rows versus geographic locations in columns;

FIG. 4 is a sample matrix of seven given plant species found in nine geographic locations;

FIG. 5 is a sample matrix with every plant species found in the geographic location containing the most plant species removed from the matrix;

FIG. 7 is a sample matrix created from an example item of interest;

FIG. 8 is a sample matrix created from an example item of interest, with every plant species found in the geographic location containing the most plant species removed from the matrix.

DETAILED DESCRIPTION OF THE INVENTION

Figure 1:
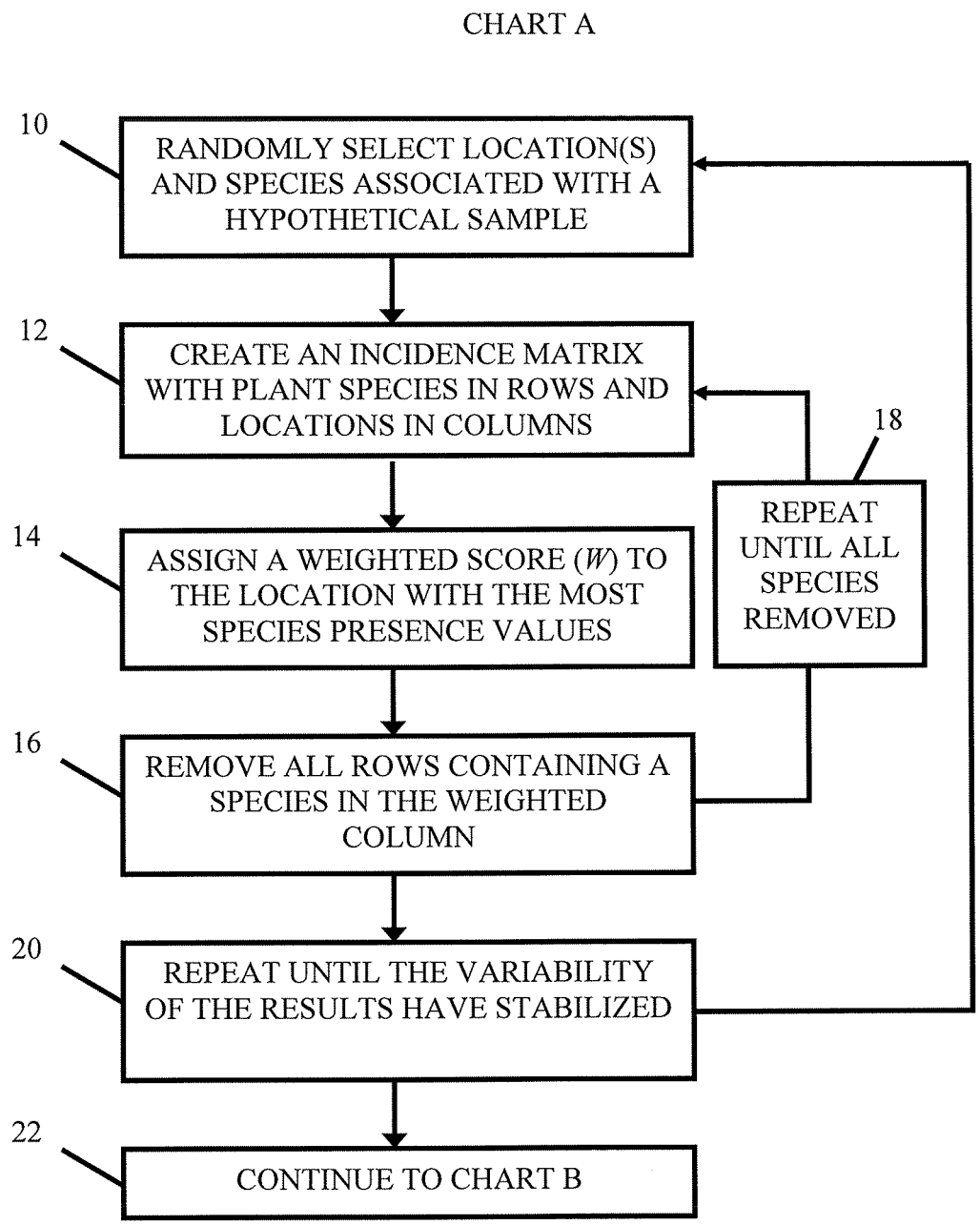
FIG. 1 is a schematic representation of an embodiment of the method according to the present invention.

Referring now to the drawings wherein like reference numerals designate identical or corresponding parts throughout the several views, there is shown in FIG. 1 a schematic representation of a method for pollen-based geolocation. Using this method, the algorithm according to one embodiment of the present invention creates and uses model parameters to determine the probability ("P") that a given location is part of the travel history of a sample of interest. Using simulated datasets derived from Monte Carlo simulation, the model parameters can be precisely associated with P, thereby allowing the algorithm to operate on real-life samples of interest.

Chart A in FIG. 1 is a schematic representation of the steps performed by the algorithm according to one embodiment of the present invention. The algorithm is used to determine the exact association between all model parameters and the probability (P) that a given location is part of the travel history of a given sample of interest, as shown in the following function:

$$P = f(W, E_S, E_L)$$

where W is a weighted score, $E_S$ is the model-estimated number of species, and $E_L$ is the model-estimated number of locations. To determine these associations, Monte Carlo-derived datasets are simulated until the variability of the results stabilizes.

Monte Carlo methods are problem-solving techniques that convert uncertain input variables into probability distributions. To determine or approximate the probability distribution, these methods use random samples of parameters or inputs to run multiple simulations. One of the benefits of Monte Carlo simulation methods is that several inputs can be analyzed simultaneously in order to create a probability distribution. Monte Carlo methods typically comprise the following steps: (i) create a random set of inputs based upon pre-defined input ranges; (ii) run the simulation using the random set of inputs; (iii) repeat steps (i) and (ii) as many times as the user defines or as is needed to create an acceptable range of probabilities or error; and (iv) combine all the individual simulation results into a final end result. It should be noted, however, that the probability distributions according to the present invention can be derived using any method known by one skilled in the art using sets of random variables to generate a probability distribution.

As an initial step 10 in the Monte Carlo-based simulation, two random variables are selected: (i) random geographic locations with defined political borders making up a hypothetical "travel history" for an imaginary sample of interest; and (ii) a random number of plant species for which pollen was found on the imaginary sample for each given geographic location. In a preferred embodiment the algorithm uses actual information about which plant species are present in a geographical location. This information can be obtained from proprietary databases or from public databases such as the National Oceanic and Atmospheric Administration's Pollen Databases or the European Pollen Database. It should also be noted that although a preferred embodiment uses the borders of political entities including but not limited to cities, counties, provinces, states, and countries to define the algorithm's geographic unit of location, other embodiments can use non-political borders to evaluate geographic regions such as continents or eco-zones, or divisions on a graticule to divide a region into newly-defined segments of equal proportion, depending on the availability and content of plant species databases or on the needs of the user.

In yet another embodiment, the algorithm uses information about which plant species are present in a geographical location at different segments of time, thereby including a temporal aspect to the travel history of the sample of interest. Thus, the Monte Carlo-based simulation might include an additional variable such as the approximate time of year that the pollen found on the imaginary sample was present in the environment.

In step 12, the algorithm plots the locations and species on an incidence matrix as depicted in FIG. 3. The locations ("X") are plotted as columns in the matrix with one column representing one location, and the plant species ("Y") are plotted as rows in the matrix with one row representing a single plant species. Depending on the random variables selected by the algorithm, the presence ("1") or absence ("0") of each element is depicted in the matrix. FIG. 4 is a graphical representation of a completed matrix with the random variables plotted. The matrix contains information about nine locations in columns A through I and seven plant species in rows 1 through 7. Spot B2, for example, contains a "1" meaning that plant species 2 is found in location B. Similarly, spot B3 contains a "0" meaning that plant species 3 is not found in location B.

In step 14, a weighted score W is assigned to each location, with one or more locations noted as having the most 1's in its (or their) column(s) and thereby receiving the highest weighted score W. In FIG. 4, location F is the only location with four or more plant species and is thus given the highest weighted score W. Every plant species found in the location (or locations) with the highest weighted score W is then removed from the analysis, as shown in step 16 of FIG. 1. Therefore the plant species in rows 1, 3, 5, and 6 are removed from the analysis as shown in FIG. 5, leaving just plant species 2, 4, and 7.

Figure 6:
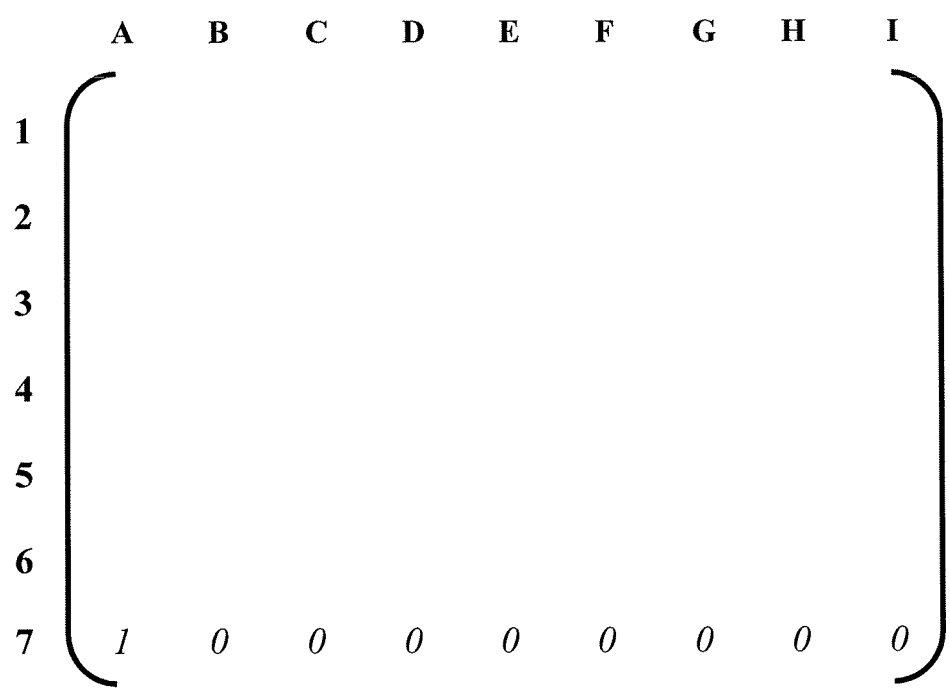
FIG. 6 is a sample matrix with every plant species found in the geographic location containing the most plant species removed from the matrix.

In step 18, the analysis is repeated until all species are removed. Since location B in FIG. 5 now has the most species presence values, it receives the highest weighted score W in this second iteration and each plant species found in column B is removed from the analysis. As shown in FIG. 6, rows 2 and 4 are removed, leaving just row 7. In the next and final iteration, location A would receive a weighted score W and the last species would be removed from the matrix.

Using the function described above that associates the weighted score W with a probability (P), the algorithm then associates a probability (P) that the imaginary item of interest traveled through each of the random locations with the results of model parameters determined by the Monte Carlo simulation, including the specific associations between the weighted score W, the model-estimated number of species ($E_s$), the model-estimated number of locations ($E_L$), and potentially other model parameters.

To reduce the variability of the results and further narrow the relationship between probability P and the model parameters, steps 10, 12, 14, and 18 are repeated with a new set of random variables as depicted in step 20, thereby simulating a desired number of hypothetical datasets using Monte Carlo methods. By performing these simulations a desired number of times, W and other model parameters can be precisely associated with P, thereby allowing the algorithm to operate on real-life samples of interest. In a preferred embodiment, the simulation is repeated between 100,000 and 10,000,000 times, although the number of required iterations of the simulation depends on several factors, including but not limited to the acceptable margin of error in assigning P to real-life samples as well as the number of detected plant species, the range data of those plant species, and the specific locations available for geolocation in the algorithm's database.

Figure 2:
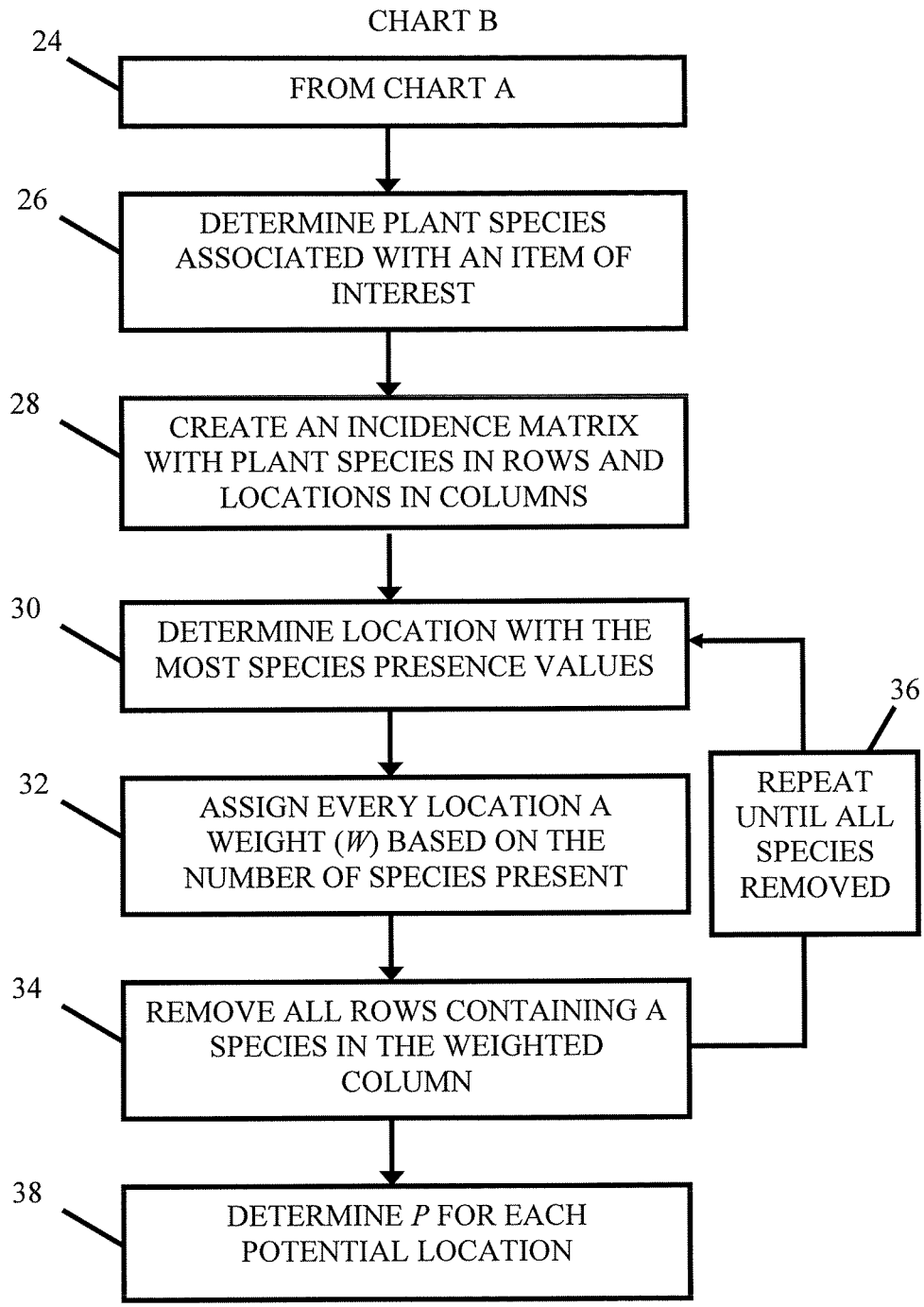
FIG. 2 is a schematic representation of an embodiment of the method according to the present invention.

Once the association between probability P and the model parameters is determined within an acceptable margin via Monte Carlo simulation, the algorithm can be used to estimate the travel history or point of origin of a real-life sample. FIG. 2 is a schematic representation of a preferred embodiment of the present invention. As an initial step 26, the plant species associated with an item of interest are determined. The item of interest can be anything capable of moving or being physically moved from one location to another and anything capable of having pollen adhere, stick, or otherwise stay in communication with it. This includes but is not limited to people, clothing, vehicles, fabrics, animals. The determination of plant species associated with the item of interest can be accomplished through any method of analysis known to those skilled in the art. These methods include: (i) collecting, sequencing, and identifying DNA or other genetic material or nucleic acid from the plant species; (ii) visual identification of plant species; (iii) and any other method capable of identifying at least one plant species.

In step 28, a result-specific incidence matrix is generated using plant species range data and the list of plant species actually detected on the item of interest with "0" or some other variable marking the absence of a species in a given location and "1" or some other variable marking the presence of each detected plant species in a given location. FIG. 7 is an example of a very simple result-specific matrix. In this example, plant species 1 through 6 were detected on the item of interest using a method of detection known to those in the art. The locations associated with those plant species are then plotted in the columns of the matrix. In this example, at least one of each plant species 1 through 6 is found in locations A, B, G, L, N, Q, R, T, and Z. Plant species 1, for example, is found in locations B, Q, and Z, while plant species 6 is found in every location except for A.

In step 30, the algorithm determines the matrix column (the location) with the most species presences. In the sample result-specific matrix shown in the FIG. 7, location Q has the most species presences. While location Q is often deemed the most likely location to be on the sample's travel history, this is also the location most likely to produce type I errors ("false positives") for nearby locations exhibiting a similar ecological state. These type I errors represent one of the many problems faced by prior pollen-based geolocation methods; namely the inability to resolve the problem of spatial dependence of neighboring locations in which locations that are geographically close to each other have similar distributions of plant species.

Each location is then assigned a weight W in step 32 based on the number of plant species presences. The more plant species a location has that were found on the item the more highly the location is weighted, and the location with the most species presences from step 30 is given a disproportionately high weight.

In step 34, all plant species found in the location with the most species presences from step 30 are removed from the matrix. FIG. 8 is a sample matrix wherein the species rows found in location Q from FIG. 7 have been removed. Location Q, the location with the most species presences from step 30, now has no species presences. In this step of the algorithm, locations are 'penalized' for having the same species as location Q, thereby acknowledging the spatial autocorrelation described above.

The algorithm then repeats steps 30 through 34, as shown in step 36 of FIG. 2. The algorithm is now searching for the location that has the most species that are not found in the location from step 30. In FIG. 8, location A now has the most species presences and represents the location that was most likely to have been overlooked using other pollen-based geolocation systems. Each location receives a weight W with location A receiving the highest weighted score. Species 2 and 4 are then removed from the matrix because these species are found in location A. Steps 30 through 34 are repeated until all species are removed from the matrix. By repeating the process, the algorithm is accounting for the potential of nested autocorrelation; that is, the potential for more than one location to produce type I errors for its neighbors.

In step 38, the probability P that the item of interest traveled through a given location in the matrix is determined using the results from the simulations to precisely determine the function that relates the weighted score W and the probability (P), and from the information derived from the real-life sample.

Figure 9:
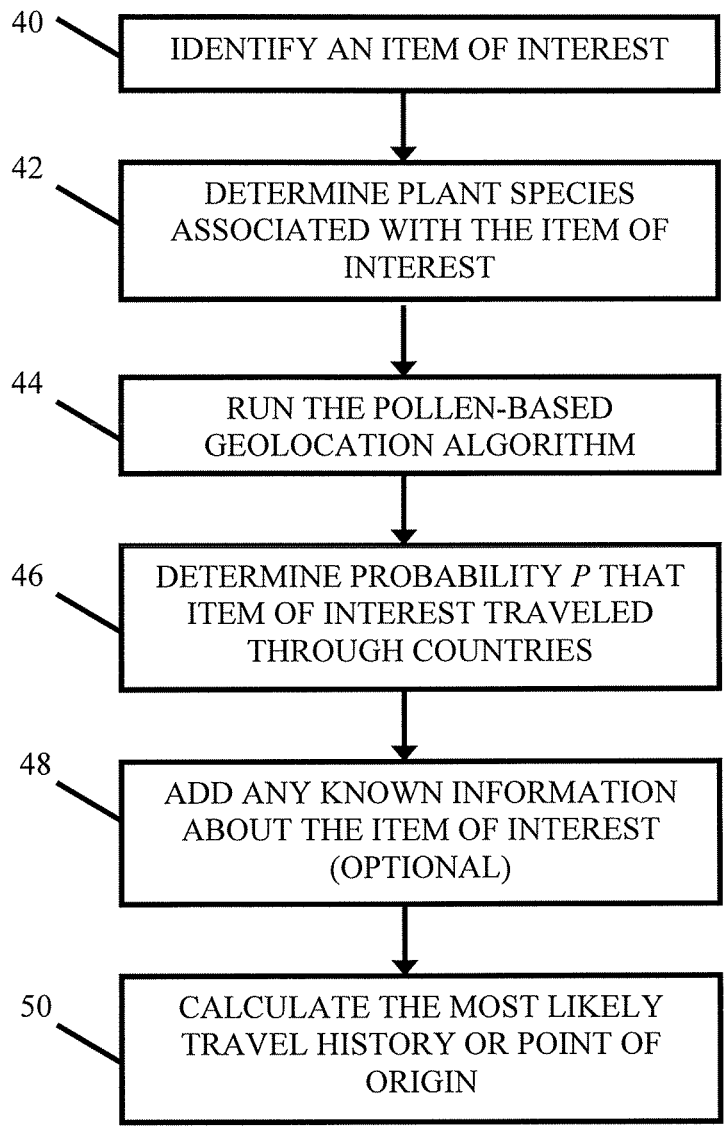
FIG. 9 is a schematic representation of an embodiment of the method according to the present invention.

In another embodiment of the present invention, the pollen-based geolocation method can be used to do any of the following, among other uses: (i) determine whether the item of interest has traveled through a country or other defined geographic location; (ii) backtrack the travel history of an item of interest; or (iii) determine the point of origin of that item of interest. The flowchart in FIG. 9 depicts this embodiment of the present invention. As an initial step 40, an item of interest is identified. As stated previously, the item of interest can be anything capable of moving or being moved. In step 42, the plant species associated with the item of interest are determined using any method or equipment known to one skilled in the art of pollen identification. The pollen-based geolocation algorithm of the present invention is run using the plant species information to determine the probability P in step 46 that the item of interest traveled through the locations containing the identified plant species.

The method can optionally include step 48 in which the algorithm takes into account any known information about the item of interest or its travel history. This can include, but is not limited to, information about the location(s) that the item of interest is known to have come from or traveled through, or information about other objects, people, or surfaces that the item of interest might have come into contact with or picked up pollen from. The additional information can be used by the algorithm to eliminate certain plant species or locations from further analysis or can be used to enhance the probability analysis of certain geographic locations. Information about the prevalence of plant species in geographic locations during seasons or other specific times of year can also be optionally added in step 48, as discussed above. This type of information might be useful for creating an estimate of the timeframe in which the item of interest might have been located in each location.

In step 50, the algorithm uses all available information from the previous steps to calculate the most likely travel history or point of origin for an item of interest.

Although the present invention has been described in connection with a preferred embodiment, it should be understood that modifications, alterations, and additions can be made to the invention without departing from the scope of the invention as defined by the claims.

What is claimed is:

1. A pollen-based method for determining the geographic travel history of an object of interest, the method comprising:
    determining, using Monte Carlo-based method of simulation, an association between a model parameter and a probability P that a first geographic location is a member of the geographic travel history of a hypothetical object-of interest, wherein said determining step comprises the following steps:

(a) generating a set of random variables corresponding to a plurality of geographic locations and a plurality of plant species associated with a hypothetical target;
(b) populating a first matrix with said set of random variables wherein each column of said first matrix contains one of said plurality of geographic locations and each row of said first matrix contains one of said plurality of plant species;
(c) identifying one of said plurality of geographic locations containing the most of said plurality of plant species in said first matrix;
(d) assigning a first weighted score W to the one of said plurality of geographic locations identified in step (c);
(e) removing the rows of said first matrix corresponding to every of said plurality of plant species found in the one of said plurality of geographic locations identified in step (c) that receives a highest first weighted score W;
(f) repeating steps (c) through (e) until every row of said first matrix is removed;
(g) associating with at least one of said plurality of geographic locations a first average weighted score W;
(h) repeating steps (a) through (g); and
(i) deriving a mathematical function that associates said first average weighted score W with the probability P that each of said plurality of geographic locations is a member of the geographic history of said target of interest; and
determining at least a portion of the geographic travel history of said object of interest using said association.

2. The method of claim 1, wherein step (h) comprises a user-defined number of repetitions.

3. The method of claim 1, wherein step (h) comprises approximately 10,000 to 10,000,000 repetitions.

4. The method of claim 1, further comprising the step of modifying said determined at least a portion of the geographic travel history of said object of interest with other information about the geographic travel history of the object of interest.

5. A pollen-based method for determining the geographic travel history of an object of interest, the method comprising:
determining an association between a model parameter and a probability P that a first geographic location is a member of the geographic travel history of a hypothetical object-of interest; and
determining at least a portion of the geographic travel history of said object of interest using said association, wherein determining at least a portion of the geographic travel history of said object of interest comprises the following steps:
(a) collecting a sample of pollen from the target of interest;
(b) identifying at least one plant species in said sample;
(c) populating a second matrix with said at least one plant species in a row of said matrix and at least one geographic location containing said at least one plant species in a column of said matrix;
(d) identifying a geographic location containing the most plant species in said second matrix;
(e) assigning a second weighted score W to said at least one geographic location of step (c);
(f) removing the rows of said second matrix corresponding to a plant species found in the geographic location identified in step (d);
(g) repeating steps (d) through (f) until every row of said second matrix is removed;
(h) assigning a second average weighted score W to said at least one geographic location of step (c); and
(i) utilizing a mathematical function derived in said first determining step to transform the second average weighted score W of said at least one geographic location into the probability P that said at least one geographic location is a member of the geographic history of said target of interest.

6. The method of claim 5, wherein the geographic location identified in step (d) receives the largest of said second weighted score W in step (e).

7. The method of claim 5, wherein step (i) further comprises:
determining a probability P that said at least one geographic location of step (c) is a member of the geographic history of said target of interest.

8. The method of claim 5, wherein the step of identifying at least one plant species in said sample further comprises characterizing at least part of the genetic material of said sample.

* * * * *